United States Patent [19]

Carrere

[11] 4,034,033
[45] July 5, 1977

[54] METHOD FOR RECOVERING MATERIAL FROM THE CENTERS OF PHONOGRAPH RECORDS

[75] Inventor: Ricardo Haro Carrere, Lima, Peru

[73] Assignee: Fredrick M. Kerr, Miami, Fla.

[22] Filed: Mar. 26, 1976

[21] Appl. No.: 670,903

[52] U.S. Cl. .................................. 264/36; 264/37; 264/106; 264/107
[51] Int. Cl.² ........................................ B29D 17/00
[58] Field of Search ............... 264/36, 37, 106, 107

[56] References Cited

UNITED STATES PATENTS

| | | | |
|---|---|---|---|
| 1,022,100 | 4/1912 | MacDonald | 264/36 X |
| 1,378,344 | 5/1921 | Hails | 264/36 |
| 1,488,253 | 3/1924 | Howbrigg | 264/36 X |
| 2,563,701 | 8/1951 | Ajero | 264/36 X |
| 2,663,050 | 12/1953 | Helm | 264/36 |
| 2,822,580 | 2/1958 | Sherwood | 264/36 |
| 3,843,060 | 10/1974 | Colburn | 264/37 X |

OTHER PUBLICATIONS

Plastics Scap Materials, *Plastics*, v. 18, Aug. 1953, pp. 285 & 292.

*Primary Examiner*—Richard R. Kucia
*Attorney, Agent, or Firm*—Gipple & Hale

[57] ABSTRACT

A method of recovering plastic material from phonograph record center sections and making plastic phonograph records incorporating the recovered material, comprising the steps of:

a. recovering the plastic material from the center portions of discarded phonograph records by removing the labels from the center portions after they have been immersed in an aromatic hydrocarbon and crushing the center portions into small particles;

b. combining the recovered material with proportions of scrap from phonograph records, briquets of plastic and new polyvinyl chloride to arrive at a new material composition comprising 20% recovered plastic from the center portions, 25% scrap plastic, 25% briquets, and 30% new polyvinyl chloride;

c. heating the new material composition in a three temperature zoned furnace with its first zone being heated to a temperature ranging from 215° F–225° F, its second zone being heated to a temperature ranging from 235° F–245° F and its third zone being heated to a temperature ranging from 255° F–265° F so that a uniform composition plastic is obtained; and d. pressing the uniform composition plastic into a flat phonograph record.

17 Claims, 1 Drawing Figure

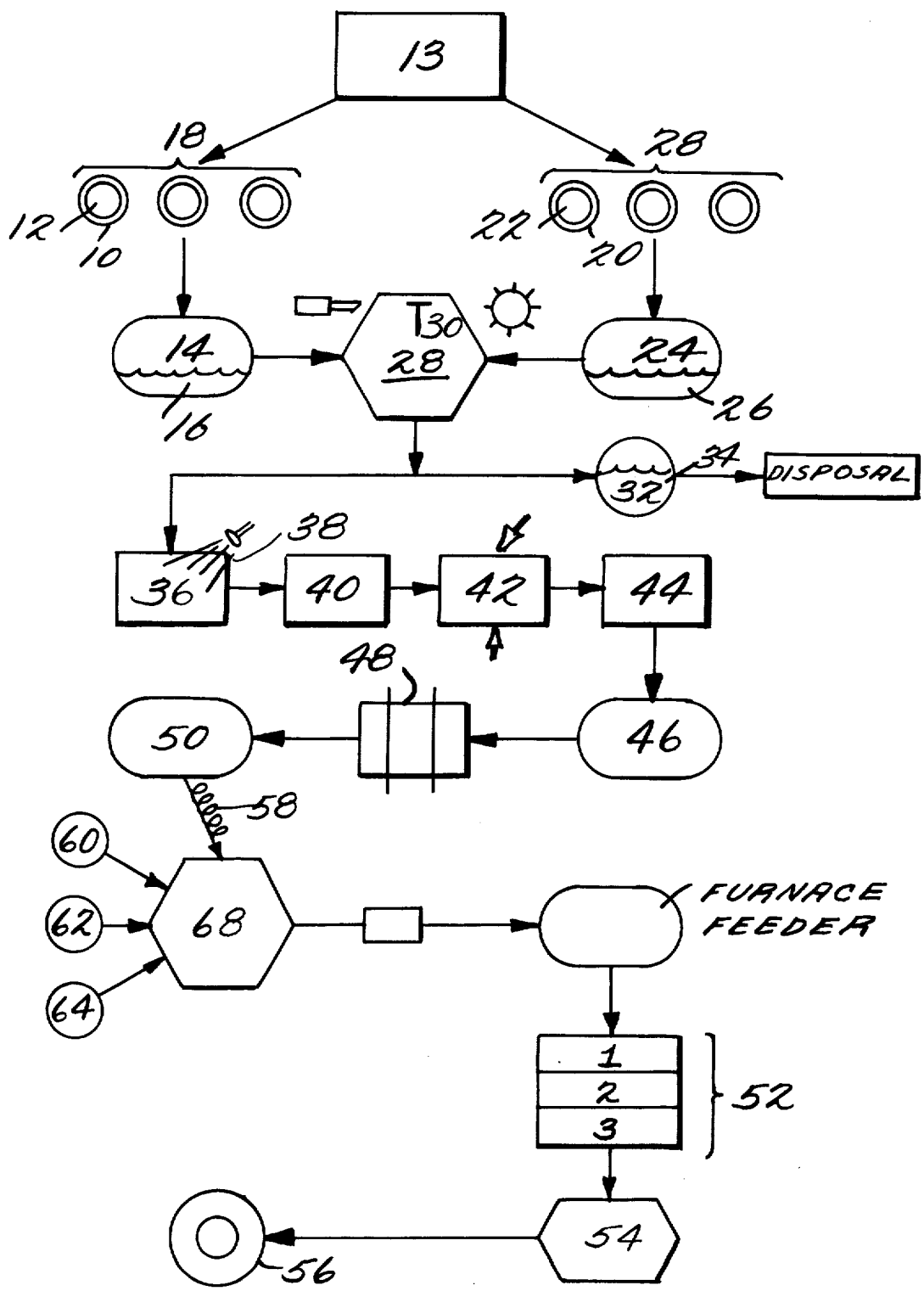

METHOD FOR RECOVERING MATERIAL FROM THE CENTERS OF PHONOGRAPH RECORDS

BACKGROUND OF THE INVENTION

The invention generally relates to a novel method for producing a material composition for a phonograph record. More specifically, the present invention discloses a process for recovering the plastic material from the centers of existing phonograph records and combining the recovered material with other readily available materials to form a new phonograph record blank. The record blank produced by the process disclosed herein possesses a uniform composition which evidences relatively fine sound reproducing properties.

Old phonograph records are generally discarded by consumers soon after their useful life has passed. The length of a record's useful life depends on a multitude of factors e.g. the audio taste of the listener, the number of times the record is played, scratching and breakage during handling and the quality of the phonographic equipment and records.

Similarly, when a record is defectively produced by a manufacturer, the manufacturer will discard the phonograph record. A common occurance in the record industry is that a well produced phonograph record is prevented from being publicly distributed due to the faulty and defective placement of the record label upon the record blank. These records, too, are discarded as waste product.

Some manufacturers in the record industry have a practice of punching out the labelled centers from these defective or useless records and then using the material obtained from the outer record section or resulting doughnut-shaped rings as base material for a composition for pressing into new records.

Therefore, the present invention envisions utilizing the plastic material of the usually discarded record centers as a constituent material in the production of new records. Thus the recovery of the plastic from the centers of the records substantially increases the percentage amount of the material which could previously be recovered from a discarded record.

It is thus seen that the present invention removes the paper labels from the centers of defective or old phonograph records, grinds these processed centers into small particles in a mill, sieves the resulting particles by size passing the particles through an electromagnet, and subsequently combines the recovered material with the scraps from other records either obtained before their labels have been attached or the scraps from the aforementioned doughnut-shaped rings or outer record sections along with briquets of a suitable plastic composition and new polyvinyl chloride (P.V.C.) to produce a composition suitable for being pressed into a new record blank.

DESCRIPTION OF THE PRIOR ART

U.S. Pat. No. 1,488,253 discloses a remade phonograph record and a process for pressing the record. In this process the old record label is not removed from the record surface but rather the label is imbedded in the remade record to provide added strength and rigidity. This process produces a record of a composition which contains particles of paper and cellulose to the ultimate detriment of the material uniformity and the sound reproducing qualities of the record.

The present invention disclosed herein eliminates the paper impurities by removing the paper label in a simple and easy manner prior to the formation of a new record blank.

The process of the '253 patent utilizes heat to soften the plastic record material. The record is then folded upon itself with the paper labels being imbedded in the interior of the record. This patent additionally discloses the prior industry practice of removing the paper labels from used records by grinding up the old records and then removing the ground up paper by a static electrical process. During milling, pieces of the paper are embedded in the plastic particles and are impossible to remove. While the prior art did remove a significant portion of the label from the record it left a sizable quantity of foreign matter behind which is detrimental to high quality sound reproduction. Thus the complex process previously performed is substantially simplified by the present invention.

Another U.S. Pat. No. 1,378,344 teaches a method for changing the surface of phonograph records. The record is wiped with a rag moistened with a hydrocarbon solvent in order to obliterate the record's original trace. Subsequently, the record is wiped with a smooth rag treated with a mixture of alcohol, ether and vinegar. The specification of the patent discloses that the employment of a rag wet with kerosene breaks down the ridges and furrows of the plastic record surface.

Still another U.S. Pat. No. 1,022,100 shows a method for re-pressing a disc sound record. The old record with label attached is covered with a substance which when subjected to heat becomes pliable. The pliable record is then subjected to compression against the desired record matrix.

SUMMARY OF THE INVENTION

The present invention comprises a novel method for the recovery of plastic material from the centers of phonograph records and the production of a new record composition. The centers of the records are first placed in glass containers containing an aromatic hydrocarbon, e.g., toluene. The toluene or other solvent softens the phonograph record plastic so that the paper label can be easily removed from the record centers. The centers without the label, are then rinsed with water, air-dried, and subsequently passed through a grinding mill. The milling operation breaks the record centers into small plastic particles. Subsequently the particles are passed through a sieve for size sorting. The particles are also passed through an electromagnet in order to remove any foreign particles which may be present. The recovered material from the centers of the phonograph records is then combined in suitable proportions with scrap record material, briquets, and other new polyvinyl chloride to produce a material composition that can be pressed into records. This material is then placed within an electrical furnace and heated at a significantly lower temperature than that normally used for first generation record material. After this processing the composite material is ready to be pressed into records.

BRIEF DESCRIPTION OF THE DRAWINGS

FIG. 1 is a schematic representation of the process of the present invention.

DETAILED DESCRIPTION OF THE DRAWINGS

As shown in FIG. 1 a plurality of separated record centers 10 having a paper label 12 attached to the surfaces by a conventional paper glue are deposited from a conveyer leading from a cuttingstamping machine 13 ready for processing. A batch 18 of the record centers 10 with the attached labels 12 are placed within a glass container 14 which contains a mixture of toluene 16. The toluene 16 is an aromatic hydrocarbon that is synthesized from heptane, a petrol hydrocarbon with a chronic oxide catalizer cinder at a temperature of 500° C, a boiling temperature of 111° C and a density of 0.874 gr/ml at 20° C. It has dissolving properties due to the fact that the polar anions from other molecules may have a weak attraction towards the electrons from the aromatic rings. The record centers 10 with the labels 12 are placed within the glass container 14 and covered with the toluene mixture 16 for a period ranging from 5 to 10 minutes.

The toluene solution softens the record, superficially, due to its dissolving properties. As the record centers 10 are generally composed of polyvinyl chloride (P.V.C.), a plastic, the P.V.C. is softened and thereby allows the record label 12 to be easily removed from the record center 10. The solvents toluene, benzene, or any other aromatic hydrocarbons, separately, or in mixture will soften the record and allow removal of the label. The solvent 16 should be of a sufficient quantity so that the record centers 10 are submerged when placed within the glass container 14.

Another batch 28 of phonograph record centers 20, are then placed within a similar glass container 24 which contains an identical solvent 26 as previously set forth. This second batch 28 of record centers 20 still have their paper labels 22 attached to their centers. The utilization of the two batches enables the process to proceed continuously as the removing of the paper labels by hand, as will be later described should take an amount of time approximately equal to the soaking time of the centers and labels in the glass containers 14 and 24. As previously stated, the first batch 18 of record centers 10 is soaked for a short period of time ranging from 5 to 10 minutes, at the conclusion of which the individual record centers 10 with attached labels 12 are removed from the glass container 14.

The labels 12 are then loosened by a pin 30 and the labels 12 can then be fully removed by hand at label removing station 28. While the labels 12 are removed by hand it should be noted that the process can be automated and the centers run through a toluene bath on a conveyor and carried to label removing areas consisting of a scraping device or a rotating wire brush which tears the labels from the record surface. The separated paper labels 12 are then placed in a plastic bowl 32 which contains an appropriate amount of water 34. The labels on the reverse or flip sides of the records are also removed by hand or machinery and subsequently placed in the plastic bowl 32. The centers 10, with labels removed, are then placed in an empty glass container 36. Once the label is removed from the reverse side of the last record of group 18, the second group 28 of record centers and labels should be ready for the label separation step. Prior to the second separation step, a third batch of record centers and attached labels should be placed within the first glass container or solvent solution 16. The amount of solvent is replenished, if necessary, to provide a sufficient quantity of solvent to again cover the record centers. It has been found that 10 to 15 kilograms of material can be processed with one gallon of toluene.

The second group of records 28 are then individually removed from the glass container 24 and their labels removed by hand or machine. The removed paper labels 22 are placed within the same plastic bowl 32 with the water 34 as were the first paper labels 12 from group 18 and are disposed of along with the other labels. Naturally the flip or reverse sides of the record centers should also have their labels removed before being placed in empty glass container 36. The glass container 24 is refilled with a plurality of record centers and a sufficient quantity of solvent.

The amount of record center material sought to be recovered determines the length of the process.

At this point in the process, all the record centers without labels should be in glass container 36 or in any other suitable depository while all the paper labels are in the water bath 34 which is contained within the waste receptacle 32. The paper labels are strained from the water baths and thrown away or otherwise properly disposed of.

All the record centers 10,20 are then rinsed with water 38 to clean the solvent from the centers, subsequently drained, and then placed in a clean container or depository 40. This washing step can alternately be accomplished by passing the record centers through a bath of water or cleansing the record centers by spraying the surface with water.

The record centers 10,20 are then air-dried with a suitable blast of air from a pressurized blower apparatus 42 to clean dust and other substances from the record centers and stored in clean container 44. If the rinsing and air drying operation are not performed, then any remaining foreign substance will influence the quality of the P.V.C. and the resulting record.

The dried record centers are deposited in a mill 46 and ground into small particles of P.V.C. In order to separate the particles according to size, the particles are preferably passed through a series of sieves 48.

After passing through the sieves 48, the particles are then passed through an electromagnetic device 50 in order to remove any impurities mixed with the particles.

Upon completion of the above procedure, a relatively large quantity of substantially pure polyvinyl chloride particles 58 of small sizes is created. As will be further shown, this recovered material 58 can be easily combined with other materials which are readily available in order to form a material which can be heated in an electrical furnace 52 to form a sheet of material 54 which in turn can be pressed into a record 56.

An example will help to illustrate the proportions of divergent material which when combined with the recovered material 58 from the centers of records 10,20 will produce a material ready to be heated in a furnace 52 and then passed into a new blank record 56.

It has been shown that by combining various materials such as 20% by weight of the recovered material 58, 25% by weight small size scrap phonograph records 60, 25% by weight briquets 62, and 30% by weight of new P.V.C. 64, a totally new record making material 66 will be created by mixer 68 which can be heated in furnace 52. It should be noted that while these percentages are the preferred composition and total 100% it has been found that the weight of the components can vary by 5% either way and the composition still retains its desired properties. Thus the recovered material can range from 15–25% of the total weight of the record material, the scrap from 20–30% of the total weight, the briquets from 20–30% of the total weight and the new P.V.C. from 25–35% of the total weight of the final record making material.

The new composition material 66 is placed in an electrical furnace 52 where the particles are heated and softened to a point where they may be made into a flat sheet of record material 54.

Conventionally the electrical furnace 52 used for making phonograph records from 100% totally new P.V.C. is operated in three separate heat zones. These zones, zone 1, zone 2 and zone 3 are generally operated at 230° F, 250° F and 270° F respectively.

It has been shown by experimentation with the aforementioned new composition material 66 that the temperature of all the zones in furnace 52 may be decreased up to 15° F and yet the temperature still provides a sufficiently high degree of heat to properly produce a record sheet ready to be pressed. More specifically, by utilizing the new composition material 66, produced by the aforementioned process, the temperature of zones 1, 2 and 3 of electrical furnace 52 can be set at ranges varying from 215° F–235° F, 235° F–245° F, and 255°–265° F respectively. This decrease in the temperature required in the electrical furnace in all three temperature zones will produce a significant economic benefit to the manufacturer in energy costs alone.

After the material 66 is heated in the electrical furnace 52 for the proper length of time the material is in a sufficiently pliable condition to be able to be pressed by standard record pressing machines schematically shown at 54 into new records 56.

It should also be obvious that the process herein described could be fully automated and therefore be completed without any constant individual attention.

While the preferred embodiment of the invention has been disclosed, it is understood that the invention is not limited to such an embodiment since it may be otherwise embodied in the scope of the appended claims.

What is claimed is:

1. A method for recovering the center portions of phonograph records carrying paper labels comprising the steps of:
   a. soaking a first batch of record center portions in a plastic dissolving liquid,
   b. simultaneously introducing a second batch of record center portions into a container of plastic dissolving solution,
   c. removing the record center portions from the container of plastic dissolving liquid,
   d. removing the paper labels from the record center portions,
   e. depositing the removed paper labels in a suitable depository,
   f. repeating the steps (c-e) for the second batch of record center portions,
   g. rinsing the record center portions and drying the same portions after rinsing,
   h. crushing the record center portions into relatively small particles,
   i. sieving the record center portions according to size, and
   j. passing the sieved particles through an electromagnet.

2. A method for recovering the center sections of phonograph records bearing a label comprising the steps of:
   a. immersing the record center sections in a plastic dissolving liquid,
   b. removing the record center sections from the liquid bath;
   c. separating the labels from the record center sections, and carrying the labels to a depository;
   d. rinsing the record center sections with a cleansing agent;
   e. crushing the record centers in small particles; and
   f. passing the crushed small particles through at least one sieve to separate the particles into differently sized particle groupings.

3. A method for recovering the plastic material from phonograph records as claimed in claim 2 wherein the plastic dissolving liquid is an aromatic hydrocarbon.

4. A method for recovering the plastic material from phonograph records as claimed in claim 3 wherein the aromatic hydrocarbon is toluene.

5. A method for recovering the plastic material from phonograph records as claimed in claim 3 wherein the aromatic hydrocarbon is benzene.

6. A method for recovering the plastic material from phonograph record center sections as claimed in claim 2 wherein the cleansing agent is water.

7. The method for recovering plastic material from phonograph records as claimed in claim 2 including a final step of passing the sized particle groupings through an electrostatic field.

8. A method of pressing plastic phonograph records comprising the steps of:
   a. recovering the plastic material from the center portions of discarded phonograph records by removing the labels from the center portions after they have been immersed in an aromatic hydrocarbon and crushing the center portions into small particles;
   b. combining the recovered material with proportions of scrap from phonograph records, briquets of plastic and new polyvinyl chloride;
   c. heating the record composition in a temperature zoned furnace at varying temperatures; and
   d. pressing the heated plastic composition into a flat phonograph record.

9. A method of pressing a phonograph record as claimed in claim 8 wherein the furnace is a three temperature zoned furnace with its first zone being heated to a temperature ranging from 215° F–225° F, its second zone being heated to a temperature ranging from 235° F–245° F and its third zone being heated to a temperature ranging from 255° F–265° F.

10. A method of pressing a phonograph record as claimed in claim 9 wherein the composition of the new record material is comprised of 20% recovered plastic from the center portions, 25% scrap plastic, 25% briquets, and 30% new polyvinyl chloride.

11. A method of pressing a phonograph record as claimed in claim 8 wherein recovered material ranging from 15%–25% of the total plastic composition weight is combined with the scrap, briquets of plastic and new polyvinyl chloride.

12. A method of pressing a phonograph record as claimed in claim 11 wherein said scrap plastic ranges from 20%–30% of the weight of the total plastic composition.

13. A method of pressing a phonograph record as claimed in claim 11 wherein said plastic briquets range from 20%–30% of the weight of the total plastic composition.

14. A method of pressing a phonograph record as claimed in claim 11 wherein said new polyvinyl chloride ranges from 25%–35% of the weight of the total plastic composition.

15. A continuous method of recovering the plastic material from several center portions of phonograph records having paper labels comprising the steps of:
 a. soaking a batch of record center portions in a solution of aromatic hydrocarbon for a period ranging from 5 to 10 minutes;
 b. removing the records from the solution of aromatic hydrocarbon, and removing the paper labels;
 c. placing the record center portions with removed labels under a liquid wash to remove the aromatic hydrocarbon;
 d. drying the washed center portions;
 e. crushing the dried center portions into small particles;
 f. sieving the crushed particles according to size;
 g. passing the sieved particles through an electromagnetic field;
 h. mixing the sieved particles with a composition of scrap polyvinyl chloride, plastic briquets and new polyvinyl chloride; and
 i. heating the mixture at varying temperatures in different zones none of which exceed 265° F to obtain a plastic composition adapted to be pressed into phonograph records.

16. A continuous method for recovering the plastic material from phonograph records as claimed in claim 15 wherein the aromatic hydrocarbon is toluene.

17. A method of recovering the plastic material from phonograph records as claimed in claim 15 wherein the step of removing the paper labels is initiated by brushing the labels off the record center sections.

* * * * *